United States Patent
Wulf

(10) Patent No.: US 11,285,930 B2
(45) Date of Patent: *Mar. 29, 2022

(54) ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM IN A UTILITY VEHICLE

(71) Applicant: ZF CV SYSTEMS EUROPE BV, Brussels (BE)

(72) Inventor: Oliver Wulf, Neustadt (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 342 days.

This patent is subject to a terminal disclaimer.

(21) Appl. No.: 16/328,731

(22) PCT Filed: Jul. 17, 2017

(86) PCT No.: PCT/EP2017/000861
§ 371 (c)(1),
(2) Date: Feb. 27, 2019

(87) PCT Pub. No.: WO2018/041386
PCT Pub. Date: Mar. 8, 2018

(65) Prior Publication Data
US 2019/0193705 A1    Jun. 27, 2019

(30) Foreign Application Priority Data

Aug. 31, 2016 (DE) ..................... 10 2016 010 462.7

(51) Int. Cl.
*B60T 13/66* (2006.01)
*B60T 13/68* (2006.01)

(52) U.S. Cl.
CPC .......... *B60T 13/662* (2013.01); *B60T 13/683* (2013.01)

(58) Field of Classification Search
CPC ...... B60T 13/68; B60T 13/683; B60T 13/662; B60T 15/00; B60T 17/04
See application file for complete search history.

(56) References Cited

U.S. PATENT DOCUMENTS 7,520,572 B2     4/2009  Hatipoglu et al.
8,382,448 B2 *   2/2013  Fries ....................... B60T 17/02
                                                        417/223

(Continued)

FOREIGN PATENT DOCUMENTS

DE        10149918 C1      5/2003
DE     102010050578 A1     5/2012

(Continued)

*Primary Examiner* — Vishal R Sahni
(74) *Attorney, Agent, or Firm* — Leydig, Voit & Mayer, Ltd.

(57) ABSTRACT

An electronically controllable pneumatic brake system for a vehicle. The electronically controllable pneumatic brake system includes wheel brakes configured to brake wheels of the vehicle, wherein a service brake braking pressure can be imposed on each of the wheel brakes via pneumatic paths starting from a foot brake valve; and an electronically controllable monostable bypass valve having a first switching position and a second switching position, wherein the monostable bypass valve is disposed in a respective pneumatic path of the pneumatic paths. In the first switching position of the monostable bypass valve, a service brake braking pressure in the respective pneumatic path can be derived depending on an actuation pressure produced by manual actuation of the foot brake valve. In the second switching position of the monostable bypass valve, the (Continued)

service brake braking pressure in the respective pneumatic path can be specified depending on a reservoir pressure prevailing in a reservoir.

14 Claims, 8 Drawing Sheets

(56) References Cited

U.S. PATENT DOCUMENTS

| | | | |
|---|---|---|---|
| 10,137,875 | B2 | 11/2018 | Hecker et al. |
| 10,501,062 | B2* | 12/2019 | Wulf ..................... B60T 13/385 |
| 2011/0012421 | A1* | 1/2011 | Bensch ................. B60T 8/1708 |
| | | | 303/115.2 |
| 2013/0214588 | A1* | 8/2013 | Kiel ....................... B60T 15/00 |
| | | | 303/6.01 |
| 2013/0221735 | A1 | 8/2013 | Kiel et al. |
| 2016/0152222 | A1* | 6/2016 | Lenz ....................... B60T 13/26 |
| | | | 303/127 |
| 2016/0207507 | A1 | 7/2016 | Roters |
| 2017/0096133 | A1* | 4/2017 | Schnittger ............. B60T 13/683 |
| 2019/0248351 | A1* | 8/2019 | Wulf ..................... B60T 15/027 |

FOREIGN PATENT DOCUMENTS

| | | |
|---|---|---|
| DE | 102010050580 A1 | 5/2012 |
| DE | 102013015949 A1 | 3/2015 |
| DE | 102013015971 A1 | 4/2015 |
| EP | 1730006 B1 | 12/2006 |
| EP | 2055541 B1 | 3/2009 |
| EP | 2532559 B1 | 12/2012 |
| WO | 2016045652 A1 | 3/2016 |

\* cited by examiner

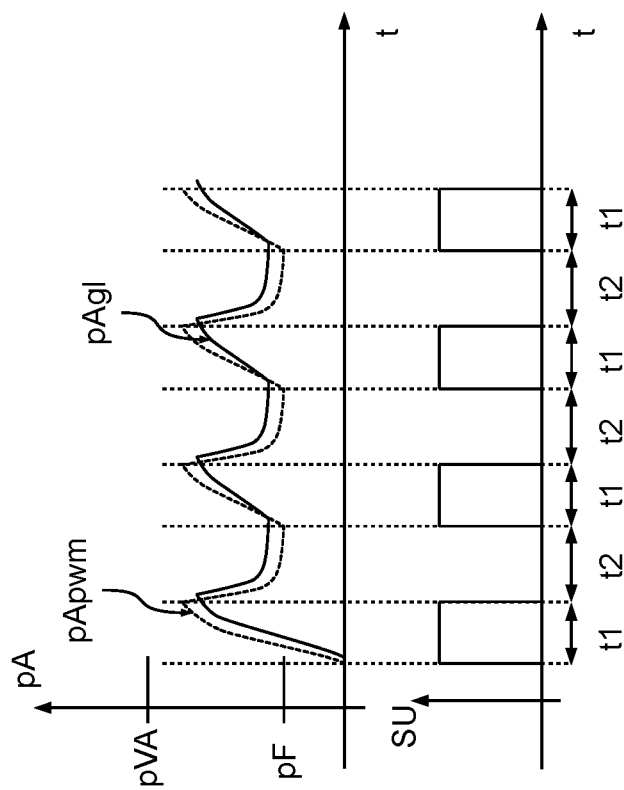

ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM IN A UTILITY VEHICLE

CROSS REFERENCE TO RELATED APPLICATIONS

This application is a U.S. National Stage Application under 35 U.S.C. § 371 of International Application No. PCT/EP2017/000861 filed on Jul. 17, 2017, and claims benefit to German Patent Application No. DE 10 2016 010 462.7 filed on Aug. 31, 2016. The International Application was published in German on Mar. 8, 2018 as WO 2018/041386 A1 under PCT Article 21(2).

FIELD

The invention related to electronically controllable pneumatic brake systems for utility vehicles and to methods for the electronic control of pneumatic brake systems.

BACKGROUND

In vehicles, in particular utility vehicles, with a pneumatic brake system, axle modulators assigned to the axles of the vehicle can be electronically actuated by a control device (ECU) for controlling brake pressures. In this case, the electronic actuation takes place either depending on a driver's command specified by a foot brake valve or else depending on an automatically specified target vehicle deceleration. The axle modulators then pneumatically produce a corresponding service brake braking pressure, which is forwarded to brake cylinders of the service brakes of the brake system.

Alternatively, the axle modulators can also be actuated pneumatically by the foot brake valve imposing a service brake control pressure corresponding to the driver's command to the axle modulators, depending on which the respective axle modulator produces the corresponding service brake braking pressure for the service brakes by an increase in the amount of air. ABS functionality is integrated in both versions, so that locking of the wheels during braking can be prevented.

A plurality of solutions is known in order to also embody an automatically actuated fallback level in such brake systems, which can automatically engage in an emergency situation if the driver is inattentive or not in position, for example. Most of these solutions require a number of additional pneumatic components, because a graduated braking demand is also provided with said solutions. Further complex solutions that enable redundant electrical actuation are known, for example by means of electropneumatic actuation of a parking brake. It is a disadvantage with all said solutions that the additional pneumatic components increase the assembly costs and the outlay and also can only be retrofitted with great difficulty.

DE 10 2013 015 949 A1 describes a pertaining brake system for cornering support, wherein it is provided to control a service brake braking pressure at service brakes of the brake system with an electronically controlled multi-way valve, wherein a service brake braking pressure is also controlled if there is no braking command from a foot brake valve as a brake signal transmitter. The multi-way valve and the foot brake valve are connected via a select-high valve to a relay valve that controls the service brake braking pressure at the service brakes. In this case, the select-high valve passes only the higher of the two pressures from the foot brake valve or the multi-way valve to the relay valve, so that the electronic braking command of the multi-way valve can be overridden by the foot brake valve.

DE 10 2010 050 578 A1 or DE 10 2010 050 580 A1 reveal a brake system in which a braking command is specified by means of a foot brake valve or a brake pedal device. This is converted in a control device into an electronic signal that actuates an axle modulator that controls the service brake braking pressure at the service brakes. If the electronics fail, in a redundancy situation the axle modulator is actuated pneumatically with a service brake control pressure by means of pneumatic lines and thereby a service brake braking pressure is output to the service brakes. The axle modulator comprises three solenoid valves and a relay valve for this. Depending on the setting of the solenoid valves, an actuation pressure specified by the foot brake valve, the reservoir pressure from the pressure medium reservoir or the atmospheric pressure from a vent is used as the service brake control pressure. As a result, the service brake braking pressure can be increased, maintained or reduced, depending on the electronically specified switching position of the three solenoid valves, depending on a manual or electrical command.

WO 2016/045652 A1 reveals an electropneumatic service brake device with a foot brake valve, the brake pedal position of which can be sensed and the output actuation pressure of which can be modified to drive the axle modulators regardless of a brake pedal position. For this purpose, a solenoid valve device with two 3/2-way valves for example is provided, which introduces a foot brake input pressure into the foot brake valve depending on an electronic demand. The acting foot brake input pressure is maintained by means of an additional holding valve. A control piston is moved mechanically in the foot brake valve by the pneumatically acting foot brake input pressure, so that an actuation pressure corresponding to the pneumatic actuation is controlled by the foot brake valve and is passed to the axle modulators as the service brake control pressure. As a result, braking can be carried out in a redundancy situation, i.e. if the electrical actuation of the service brakes fails and if there is no manual actuation by the driver by means of the foot brake valve and the pneumatic channel thereof. Thus, there is effectively an electronically controlled, mechano-pneumatic actuation of the foot brake valve.

A further mechanical actuation of the foot brake valve is for example revealed in U.S. Pat. No. 7,520,572 B2 and EP 1 730 006 B1. In each case a method is revealed with which the foot brake valve can be actuated by an electronic control device in addition to by the brake pedal. Therefore, an electronic brake system is provided, the service brakes of which are actuated by the foot brake valve and by means of an additional relay valve. On the one hand, the braking command can be sent to the foot brake valve by means of the brake pedal or else independently thereof by means of a brake valve actuator, which is disposed between the brake pedal and the foot brake valve. The brake valve actuator is controlled by the electronic control device by controlling a control pressure at the brake valve actuator, which is implemented as a pneumatic valve for example, in the presence of a control signal for decelerating the vehicle so that the foot brake valve is actuated.

In DE 10 2013 015 971 A1 a brake device is described, in which the foot brake valve is pneumatically connected to the service brakes by means of a control valve. In a first switching position of the control valve, the actuation pressure produced by the foot brake valve by manual actuation is output directly to the service brakes. In a second switching position, a non-return valve is connected between the foot brake valve and the service brakes. The non-return valve enables an increase in pressure at the service brakes that is brought about by the foot brake valve but prevents a reduction in pressure or venting of the service brakes and thus ensures that the service brake braking pressure that has been built up is maintained.

In EP 2 532 559 B1, a brake system is described that comprises two bypass valves implemented as 2/2-way valves and at least one select-high valve. The bypass valves can be electronically switched, depending on a measured service brake control pressure, such that a pressure medium flowing in from the pressure medium reservoir is short-circuited with a reservoir pressure or a vent is short-circuited with the select-high valve. As a result, an electrically controlled increase in pressure or reduction in pressure of the service brake braking pressure can be achieved. With a corresponding switching position of the bypass valves, the service brake control pressure can also be maintained. In addition, the actuation pressure specified by the driver by actuation of the foot brake valve is also passed to the select-high valve. The select-high valve then forwards the higher of the two applied pressures to the service brakes, i.e. either the reservoir or foot brake input pressure provided by the corresponding bypass valve or the actuation pressure. Thus, with two bypass valves and a select-high valve an electronically controlled increase in pressure, maintenance of pressure or reduction in pressure can be achieved if there is no manual driver actuation.

EP 2 055 541 B1 describes a driver assistance system with a bistable bypass valve and a monostable bypass valve. By means of the bistable bypass valve, a spring mechanism of a parking brake can be ventilated or vented by connecting either the pressure medium reservoir or a vent to a pneumatic control input of an axle modulator by means of a corresponding switching position of the bistable bypass valve for releasing the spring mechanism or for clamping the spring mechanism respectively. The monostable bypass valve is disposed between the bistable bypass valve and the axle modulator, wherein in one switching position the monostable bypass valve passes the parking brake control pressure that is output by the bistable bypass valve to the axle modulator and otherwise prevents a flow connection. I.e. in the second switching position of the monostable bypass valve, the prevailing parking brake control pressure is maintained at the axle modulator.

SUMMARY

In an embodiment, the present invention provides an electronically controllable pneumatic brake system for a vehicle. The electronically controllable pneumatic brake system includes wheel brakes configured to brake wheels of the vehicle, wherein a service brake braking pressure can be imposed on each of the wheel brakes via pneumatic paths starting from a foot brake valve; and an electronically controllable monostable bypass valve having a first switching position and a second switching position, wherein the monostable bypass valve is disposed in a respective pneumatic path of the pneumatic paths. In the first switching position of the monostable bypass valve, a service brake braking pressure in the respective pneumatic path can be derived depending on an actuation pressure produced by manual actuation of the foot brake valve. In the second switching position of the monostable bypass valve, the service brake braking pressure in the respective pneumatic path can be specified depending on a reservoir pressure prevailing in a pressure medium reservoir. The service brake braking pressure in the respective pneumatic path can be produced by a changeover of the monostable bypass valve depending only on the actuation pressure and/or depending on the reservoir pressure to implement an electropneumatic redundancy.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
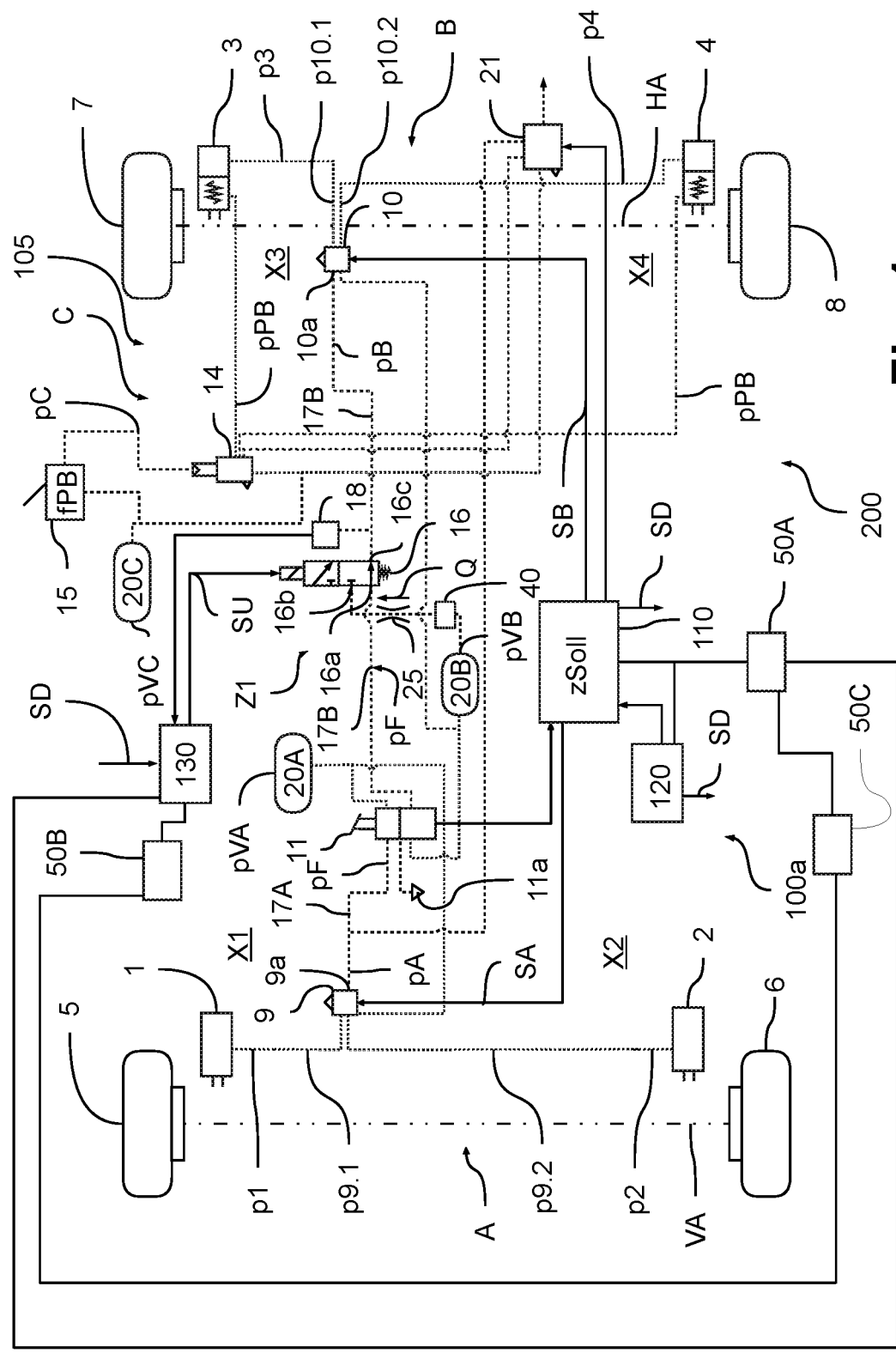
FIGS. 1a, b, and c show, as block diagrams, brake systems according to embodiments of the invention with a bypass valve.

Embodiments of the invention provide electronically controllable pneumatic brake systems for utility vehicles, with which safe and reliable electronically controlled redundant braking, in particular in an automatically controlled vehicle, can be guaranteed with little cost. Furthermore, embodiments of the invention provide methods for the electronic control of such brake systems.

According to the invention, it is therefore realized that in a vehicle, in particular in an automatically controllable utility vehicle, in the event of a failure or a defect of the electrical actuation or electrically controlled actuation of service brakes of the vehicle, it is only necessary in response that the vehicle can be safely transitioned into a decelerated state. Therefore, components that are actually not necessary for rapid and safe deceleration of the vehicle in such a failure case or redundancy case, in particular components that provide finely graduated braking or jolt-free braking or the determination of a braking effect or low wear, low air consumption or low noise generation, can be eliminated. This is because the redundancy case is only an exceptional case that only occurs rarely during the service life of the vehicle, so that the components relevant to the redundancy case are not relied upon for low noise generation or low wear operation, for example.

According to the invention, it is therefore provided to dispose a monostable bypass valve in a pneumatic path starting from a foot brake valve, which monostable bypass valve is preferably implemented as an electrically controllable 3/2-way valve, and which can be actuated by a bypass control device (bypass ECU) by means of a bypass signal in a redundancy situation. The monostable bypass valve can be changed over by means of the bypass signal between two switching position depending on an electrical demand, wherein it is selected by means of the switching position whether a service brake braking pressure is fed to wheel brakes or service brakes of the vehicle via the pneumatic path, wherein said brake pressure is produced depending on a manual actuation of the foot brake valve and/or depending on a reservoir pressure prevailing in a pressure medium reservoir.

A pneumatic path is understood to mean a pneumatic connection between the foot brake valve and a service brake of the vehicle, by means of which the respective service brake can be supplied with a defined service brake braking pressure. In the case for example of four service brakes pneumatically operated by means of the foot brake valve in a vehicle, four such pneumatic paths are provided. An axle modulator is assigned to the pneumatic paths of a defined vehicle axis, wherein said axle modulator boosts the air volume of a service brake control pressure transferred via the corresponding pneumatic paths and outputs said air volume-boosted axle modulator pressure as a service brake braking pressure to the respective pneumatic path for actuation of the respective service brake. The monostable bypass valve can be disposed in the respective pneumatic path upstream or downstream of the axle modulator in this case, in order to impose either the service brake control pressure or the service brake braking pressure depending on the set switching position.

Thus, it is advantageously achieved, by the use of only one additional monostable bypass valve in the pneumatic path between the foot brake valve and the respective service brake, that in a redundancy situation, i.e. in the event of a failure or a defect of the electrically controlled actuation of the service brakes, either exclusively a manually or automatically specified braking command is carried out in pneumatically redundant ways or an electropneumatic redundant implementation of braking is carried out by electrically redundant actuation of the monostable bypass valve, which then at least partly derives from the reservoir pressure. In this case, the additional monostable bypass valve in the pneumatic path does not influence the manual operation outside of the electrical or pneumatic redundancy.

A failure or a defect of the electrically controlled actuation of the service brakes is understood to mean for example that the axle modulators and/or a service brake control device (ECU) that is electrically controlling the axle modulators and/or an assistance control device that is automatically controlling the vehicle has a defect, or that transmission faults, for example a CAN timeout, are occurring between the individual components.

In the event of the monostable bypass valve being disposed between the foot brake valve and the axle modulator, preferably only one monostable bypass valve per vehicle axis is necessary, because the pneumatic paths between the foot brake valve and the axle modulator coincide and run through the same pneumatic control line. As a result, advantageously costs can be saved.

If however an arrangement after the axle modulator of the corresponding vehicle axis is provided, then one bypass valve each can be assigned to each service brake of said vehicle axis, because the pneumatic paths branch off after the axle modulator. Thus, wheel-specific imposition of a service brake braking pressure is advantageously possible depending on the switching position of the bypass valve. In that case, electrically controlled redundant steering braking can advantageously be carried out by the bypass control device actuating the bypass valves in the respective pneumatic path differently.

Advantageously, in order to implement safe electropneumatic redundancy, no cost-intensive valves are thus necessary, for example a plurality of cooperating bistable solenoid valves, which provide staged braking, or a select-high valve, which passes the pressure medium either from the foot brake valve or from the axle modulator or from the pressure medium reservoir. According to the invention, it is thus recognized that the probability of a total failure of the electrical, automated actuation of the service brakes in a vehicle during the service life is very low and therefore a solution that is optimized in particular with respect to noise generation when changing over the corresponding valve, pressure medium consumption and wear on the service brakes is not absolutely necessary. All these aspects have no effect on deceleration of the vehicle in a redundancy situation, so that they are not to be considered for said special exceptional case or the negative effects thereof are accepted to save costs.

The monostable bypass valve having just two switching positions, the service brake braking pressure will always be aligned with the prevailing service brake control pressure. Maintaining the service brake braking pressure for example following a changeover of the monostable bypass valve or after a reduction of the braking demand by the driver is therefore not possible, at least not with the monostable bypass valve. The bypass valve shall only provide that in the emergency case in the event of a failure of the electronic actuation of the axle modulators, safe deceleration of the vehicle into a safe state, in particular to a standstill, can be carried out electronically redundantly via the pneumatic path.

Thus, in the event of a failure in the electrical actuation of the service brakes or the axle modulators, as a result of which the braking demanded by the foot brake valve or automatically can no longer be implemented properly, safe redundant actuation can still be carried out in a simple and inexpensive way by means of the pneumatic paths.

The bypass valve is monostable according to the invention, i.e. only a first switching position of the bypass valve is stable, wherein in the first switching position the service brake braking pressure is forwarded depending on the manual braking command. I.e. in the respective pneumatic path, depending on an actuation pressure pneumatically specified by the foot brake valve a corresponding service brake braking pressure is controlled at the respective service brake by the bypass valve passing—depending on the position in the pneumatic path—the actuation pressure as the service brake control pressure or the air volume-boosted axle modulator pressure as the service brake braking pressure.

In this case, stable is understood to mean that without electrical actuation of the monostable bypass valve by means of the bypass signal, i.e. the bypass valve is de-energized, the stable (first) switching position is set automatically. This can for example be achieved by a suitable spring preload.

This can be achieved for example by an inexpensive electrically controllable 3/2-way valve, for example a solenoid valve, with two switching positions, with which the electropneumatic redundancy function can be implemented by changing said valve into the second switching position during energization, in which the bypass valve—depending on the position in the pneumatic path—passes the reservoir pressure as the service brake control pressure or as the service brake braking pressure, and is otherwise in the first switching position, in which the bypass valve—depending on the position in the pneumatic path—passes the actuation pressure as the service brake control pressure or the air volume-boosted axle modulator pressure as the service brake braking pressure.

The first, stable switching position is set as standard in this case if it can be assumed that the driver can still intervene in braking in a redundancy situation. On the other hand, the second, non-stable switching position is set if it is determined that in a redundancy situation the current braking is not sufficient, since the driver is not in position, is inattentive or is braking too little, for example. In that case, a braking effect can be automatically increased by means of the pneumatic path by predefining, by means of the bypass valve, a higher reservoir pressure prevailing in the pressure medium reservoir than the service brake control pressure or than the service brake braking pressure. This preferably provides for full application of the service brakes in the case of a continuously set second switching position.

According to an advantageous development, a staged adjustment of the service brake braking pressure can also be achieved with the design according to the invention by means of the bypass control device. For this purpose, the bypass valve can for example be actuated in a pulsed manner, i.e. the bypass valve is alternately energized and de-energized. In this case, the bypass signal is preferably produced by pulse width modulation. As a result, there is an alternating change back and forth between the first and second switching positions, so that the service brake control pressure or the service brake braking pressure oscillates back and forth between the driver's command, i.e. the actuation pressure or the axle modulator pressure, and the reservoir pressure depending on the duration of the set first and second switching positions, i.e. it is produced depending on both pressures. Thus, an oscillatory profile of the service brake control pressure or the service brake braking pressure results, which is converted in a suitable manner by the service brakes into braking that is also pulsating.

Advantageously, as a result a type of cadence braking function can be implemented, by which the vehicle is alternately decelerated more and less strongly in order to bring about on average a certain specified target vehicle deceleration, with which the vehicle is transitioned into a safe state. The cadence braking function can advantageously be achieved by ensuring that in the event of pulse width modulated actuation a wheel that is tending to lock can be run up again. For example, this is the case if the service brake control pressure or the service brake braking pressure falls below a pressure limit of for example 1 bar at least for a time limit of 0.25 s, for example. In this case, it is ensured that a wheel that is tending to lock resumes rotation.

This can have a positive effect on the ride stability and the steerability of the vehicle, because in a redundancy situation, i.e. in the event of an electronic failure, it is not ensured that the brake slip control present in the vehicle by means of ABS functionality is functioning correctly. This can be replaced in said exceptional case by the cadence braking function. As a result, a redundant ABS functionality with additional components can also be saved. Here too it is detected that for the exceptional case of an electrical defect costs can be saved by implementing a simple replacement function that can also provide for safe braking.

Owing to the pulse width modulation and the alternating changeover, in this case no quasi-constant average service brake control pressure is set with which the service brakes are actuated. By alternating the service brake control pressure according to the invention, a defined target vehicle deceleration is indeed also achieved on average, but this also brings about an actual alternating braking behavior, so that ride stability is maintained in the event of redundant electrical actuation in the sense of a cadence braking function.

The changeover behavior brought about by the pulsed actuation is designed in this case so that acceptable values are set for the vehicle deceleration, ride stability and steerability in the event of cadence braking.

The lines and valves through which flow passes provide for a type of low pass filtering in this case, which provides that the service brake control pressure or the service brake braking pressure increases or decreases less steeply if switching back and forth occurs between the two switching positions. The edges in the profile of the service brake control pressure or the service brake braking pressure thus rise or fall less steeply; the cadence braking is calmed by a smoothed profile.

According to an advantageous development, said smoothing can be further optimized by adjusting the reservoir pressure, thus avoiding the service brake control pressure or the service brake braking pressure rising to a very high reservoir pressure of for example 12 bar in the event of a changeover to the second switching position of the bypass valve. For this purpose, a plurality of versions is possible, which can be provided alternatively or additionally:

In the simplest embodiment, a choke is disposed between the pressure medium reservoir, which provides the service brake control pressure or the service brake braking pressure in the second switching position, and the bypass valve. Said choke reduces a volumetric flow of the pressure medium flowing from the pressure medium reservoir. As a result, the service brake control pressure or the service brake braking pressure does not increase abruptly to the reservoir pressure in the event of a changeover from the first to the second switching position but slowly, because a constriction is formed in the flow path by the choke. A changeover back to the first switching position in the event of pulse width modulated actuation of the bypass valve is thus carried out at a point in time at which the service brake control pressure or the service brake braking pressure is increasing less steeply, so that overall the profiles are further smoothed and the cadence braking is calmed.

According to a further embodiment, it can be provided to use a pressure medium reservoir in which a lower reservoir pressure prevails from the start. For this purpose, for example a third pressure medium reservoir with a third reservoir pressure of no more than 8 bar that is provided for a parking brake can be used.

According to a further embodiment, a pressure reducer can also be installed as a component that passes the pressure medium from the pressure medium reservoir only up to a defined pressure limit.

By limiting the acting reservoir pressure, in all cases it can additionally be achieved that in the event of an inadvertent changeover of the bypass valve to the second switching position, a vehicle deceleration that is unintentionally commanded thereby is limited.

An unintentional deceleration owing to a faulty redundant actuation can also be achieved according to an advantageous development by an additional electrically controllable safety valve, for example a 2/2-way valve, by means of which a safety function can be implemented. This is disposed between the corresponding pressure medium reservoir, which provides the possibly pressure-adjusted reservoir pressure in the second switching position, and the bypass valve and is changed over at the same time as the bypass valve. Only if both valves are energized is the reservoir pressure output as the service brake control pressure to the respective axle modulator or as the service brake braking pressure to the respective service brake. As a result, unintentional braking can be prevented even in the event of an inadvertent changeover of the bypass valve.

According to an advantageous development, the bypass control device can determine whether the driver is operating the foot brake valve or not by means of a pressure sensor or a simple pressure switch at which the service brake control pressure of a defined vehicle axle is applied, preferably the front axle. In the event of actuation, the pressure switch or the pressure sensor outputs a corresponding signal to the bypass control device. As a result, in a redundancy situation it can be determined whether the driver is responding and whether the redundant electrical actuation for this can be switched off by means of the bypass valve. Furthermore, latent defects can be detected therefrom by means of a plausibility check using the driver's command that is derived as a result.

A latent defect can for example be that an emergency stop button is defective or the bypass signal cannot be transmitted correctly. In order to exclude that such a latent defect is present, actuation of the bypass valve can also be carried out at defined intervals in normal operation while observing the pressure sensor. As a result, it can be avoided that electrically redundant actuation of the bypass valve that only occurs in the exceptional case is prevented by a latent defect.

Advantageously, the bypass control device is supplied by means of a first energy source and in addition by means of a second energy source that is independent thereof, and a service brake control device (ECU) that can command braking by means of the service brakes by using an electrical demand to the axle modulators is supplied only by means of the first energy source, so that in the event of a failure of electrical actuation by means of the service brake control device (ECU) because of a defect in the first energy source, redundant electrically controlled braking can still be brought about by means of the pneumatic paths through the bypass control device. However, a power supply can also be guaranteed in a redundancy situation by a generator, for example an alternator, and/or a short-term storage device and/or a high-voltage storage device, each of which functions independently of the first power supply.

The arrangement according to the invention with the bypass valve can advantageously be provided in any pneumatic path of the vehicle or in any brake circuit by means of which the service brakes can be pneumatically actuated in a redundancy situation. The arrangement is however preferably provided in a first brake circuit on a front axle of the vehicle in order to also enable electronically controlled redundant deceleration of the vehicle by means of the service brakes via the corresponding pneumatic paths of the front axle in addition to a parking brake on a rear axle in a redundancy situation. In addition, the arrangement according to the invention can also be provided in an electronically controllable pneumatic brake system of a trailer as the vehicle in order to be able to suitably decelerate the wheels of the trailer by means of the service brakes.

Figure 1B:
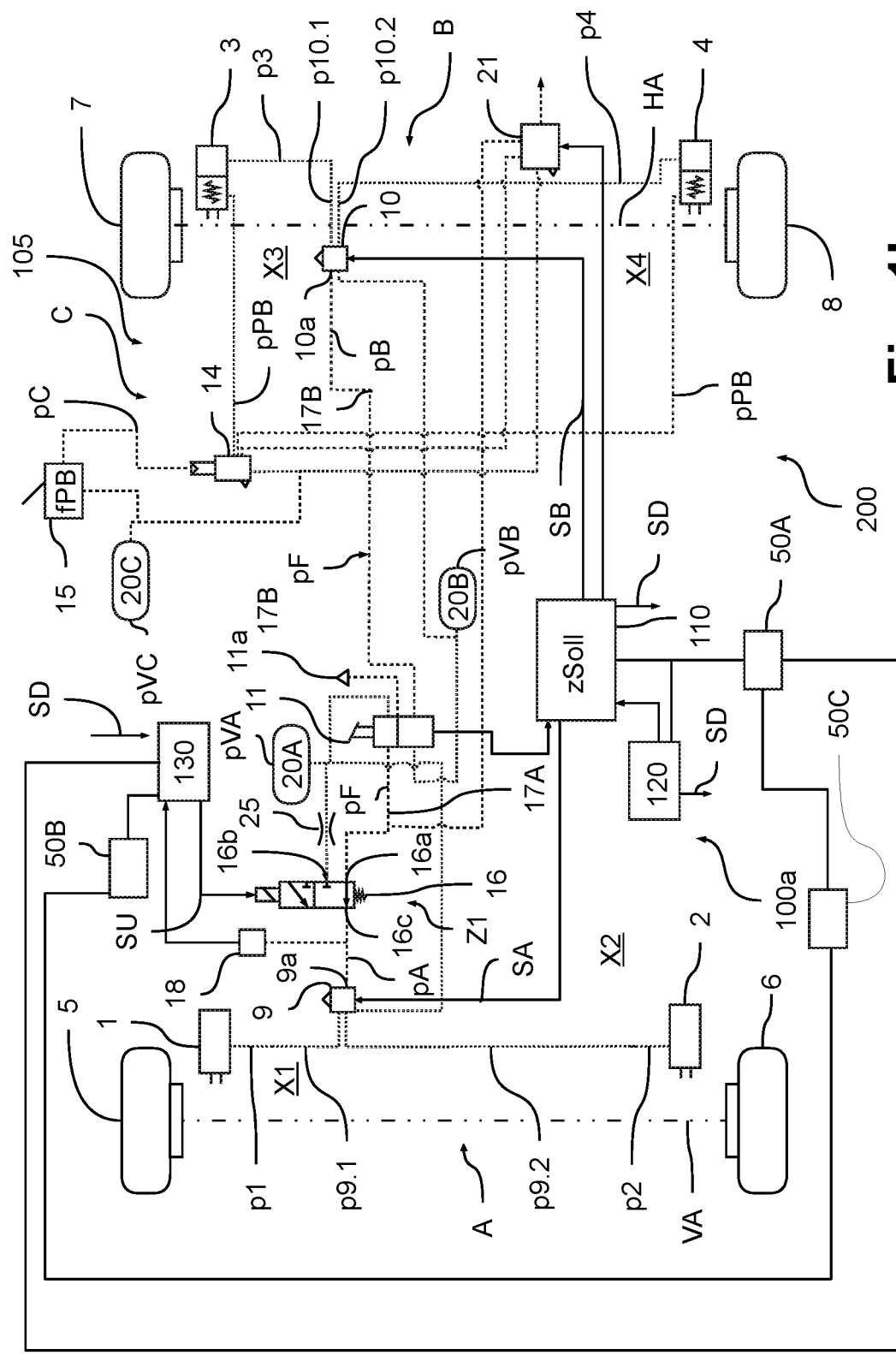
FIG. 1d shows a time profile of a pulsed service brake control pressure in a brake system according to FIG. 1b.
FIGS. 1e, f, and g show versions for supplying power to an electropneumatically controlled brake system.

In the embodiments according to FIG. 1a and FIG. 1b, a section of an electropneumatic brake system 100a of a vehicle 200, in particular a utility vehicle, is represented as a block diagram, wherein the electropneumatic brake system is implemented as an EBS brake system 100a, i.e. a braking command is carried out electrically in normal operation. The EBS brake system 100a comprises four wheel brakes 1, 2, 3, 4 for this, which are used to brake the wheels 5, 6, 7, 8 of the vehicle 200. For deceleration, three brake circuits A, B, C are provided, with each of which a pressure medium reservoir 20A, 20B, 20C is associated in order to supply the respective brake circuits A, B, C with a pressure medium and thus to enable the build-up of a brake pressure p1, p2, p3, p4, pPB for the respective wheel brakes 1, 2, 3, 4. A corresponding reservoir pressure pVA, pVB, pVC prevails In each pressure medium reservoir 20A, 20B, 20C, wherein in the first and second pressure medium reservoirs 20A, 20B a reservoir pressure pVA, pVB of for example 12 bar prevails and in the third pressure medium reservoir 20C a third reservoir pressure pVC of for example 8 bar prevails.

In a first brake circuit A, the wheel brakes 1, 2 are disposed on the wheels 5, 6 of a front axle VA, wherein the wheel brakes 1, 2 are implemented as service brakes. The wheel brakes 3, 4 on a rear axle HA are implemented as combined spring mechanism brakes and service brakes, so that the wheels 7, 8 of the rear axle HA can be braked mutually independently by means of a second brake circuit B using a service brake function on the one hand and additionally by means of a third brake circuit C using a parking brake function.

In the first two brake circuits A, B, the service brake braking pressures p1, p2, p3, p4 are produced in normal operation by means of electrically controlled axle modulators 9, 10 using control signals SA, SB electrically transmitted from a service brake control device 110 (ECU) to the axle modulators 9, 10, which then, supplied from the corresponding pressure medium reservoir 20A, 20B, control a defined service brake braking pressure p1, p2, p3, p4. The level of the service brake braking pressures p1, p2, p3, p4 results in particular from a demanded target vehicle deceleration zSoll, which results according to said exemplary embodiment from a demand manually specified by the driver by means of a foot brake valve 11 or from an assistance control device 120 (ADAS-ECU, (A)dvanced-(D)river-(AS)sistance) that is provided for automatic control of the vehicle 200.

A case of ABS brake slip at the wheels 5, 6, 7, 8 of both axles of the vehicle VA, HA can be responded to by corresponding electrical actuation of the respective axle modulator 9, 10.

In the event of a failure or a defect of the electronic actuation of the two axle modulators 9, 10, a change can be made to a pneumatic fallback level by controlling an actuation pressure pF that is pneumatically output when the foot brake valve 11 is actuated by the driver as a pneumatic service brake control pressure pA, pB at the respective axle modulator 9, 10 of the respective brake circuit A, B. In this case a first service brake control pressure pA is passed to a first pneumatic control input 9a on the first axle modulator 9 and a second service brake control pressure pB is passed to a second pneumatic control input 10a on the second axle modulator 10, wherein the pneumatic control inputs 9a, 10a are enabled in a redundancy situation for actuation of the respective axle modulator 9, 10.

The respective axle modulator 9, 10 boosts the service brake control pressure pA, pB correspondingly and outputs an air volume-boosted axle modulator pressure p9.1, p9.2, p10.1, p10.2, which is output as the service brake braking pressure p1, p2, p3, p4 to the corresponding wheel brakes 1, 2, 3, 4. Thus, a change can be made from electronic actuation of the axle modulators 9, 10 in the pneumatic redundancy case to pneumatic actuation by the foot brake valve 11, wherein the actuation of the respective wheel brakes 1, 2, 3, 4 in a redundancy situation takes place via pneumatic paths X1, X2, X3, X4. A pneumatic path X1, X2, X3, X4 is understood to mean the entire pneumatic connection between the foot brake valve 11 and the respective wheel brake 1, 2, 3, 4, via which the respective wheel brake 1, 2, 3, 4 is supplied with a defined service brake braking pressure p1, p2, p3, p4, wherein according to FIGS. 1*a* and 1*b* four pneumatic paths X1, X2, X3, X4 are provided.

In the third brake circuit C, a parking brake-relay valve 14 is provided. The parking brake-relay valve 14 is pneumatically actuated by means of a parking brake control pressure pC commanded by a parking brake valve 15, which the parking brake-relay valve 14 boosts in the usual way and outputs the same as the parking brake braking pressure pPB to the spring mechanism part in the wheel brakes 3, 4 of the rear axle HA. The parking brake control pressure pC is produced according to said embodiment depending on the manual actuation of the parking brake valve 15 by the driver, which as a result demands a defined parking brake force fPB. However, there can also be an electronic parking brake demand (which is not represented).

The first service brake control pressure pA or the parking brake control pressure pPB can also be output to a trailer that is not represented by means of a trailer control valve 21 in order to decelerate said trailer.

Furthermore, a bypass valve 16 is provided in the electropneumatic brake system 100*a* according to the invention, wherein according to FIG. 1*b* said bypass valve 16 is disposed in a first control line 17A assigned to the first brake circuit A, which connects the foot brake valve 11 to the first axle modulator 9 on the front axle VA, and according to FIG. 1*a* said bypass valve 16 is disposed in a second control line 17B assigned to the second brake circuit B, which connects the foot brake valve 11 to the second axle modulator 10 on the rear axle HA. Because the function of the monostable bypass valve 16 is identical in FIG. 1*a* and FIG. 1*b* and this only controls another brake circuit A, B, both figures are referred to in parallel below. It can also be provided to dispose a bypass valve 16 in each brake circuit A, B, thus resulting in a brake system that corresponds to a combination of the two FIGS. 1*a*, 1*b*.

The monostable bypass valve 16 is implemented as an electrically controllable 3/2-way valve, for example as a solenoid valve, that can be brought into two switching position Z1, Z2 and that is used to command a service brake control pressure pA, pB for the respective pneumatic path X1, X2, X3, X4, wherein the two pneumatic paths X1, X2 of the front axle VA and the two pneumatic paths X3, X4 of the rear axle HA each coincide between the foot brake valve 11 and the respective axle modulator 9, 10 because they both run in the same control line 17A, 17B.

A first input port 16*a* of the monostable bypass valve 16 is connected to the foot brake valve 11 and a second input port 16*b* is connected to the pressure medium reservoir 20A, 20B assigned to the respective brake circuit A, B. An output port 16*c* is connected to the first pneumatic control input 9*a* on the first axle modulator 9 (FIG. 1*b*) or the second pneumatic control input 10*a* on the second axle modulator 10 (FIG. 1*a*), so that the service brake control pressure pA, pB for the respective brake circuit A, B is commanded either depending on the actuation pressure pF or depending on the first or second reservoir pressure pVA, pVB according to the switching position Z1, Z2.

In the first switching position Z1 of the monostable bypass valve 16, the actuation pressure pF produced depending on the driver actuation is passed through at the output port 16*c*, so that said pressure is applied as the service brake control pressure pA, pB at the respective pneumatic control input 9*a*, 10*a*. In the second switching position Z2 of the monostable bypass valve 16, the respective pressure medium reservoir 20A, 20B is connected to the output port 16*c*, so that the reservoir pressure pVA, pVB prevailing in the respective pressure medium reservoir 20A, 20B is output as the service brake control pressure pA, pB.

Thus, in the first switching position Z1 a service brake braking pressure p1, p2, p3, p4 corresponding to the driver's command is controlled at the respective wheel brakes 1, 2, 3, 4 by the respective axle modulator 9, 10. If the foot brake valve 11 is not actuated, the changeover of the monostable bypass valve 16 into the first switching position Z1 therefore automatically results in venting of the respective control line 17A, 17B, because the actuation pressure pF is reduced to approximately atmospheric pressure pAtm via a venting connection 11*a* on the foot brake valve 11. Accordingly, a lower service brake control pressure pA, pB and a lower service brake braking pressure p1, p2, p3, p4 are also controlled at the respective wheel brakes 1, 2, 3, 4, and the vehicle 200 is then not decelerated, at least by means of the pneumatic paths X1, X2, X3, X4 in a redundancy situation in the first two brake circuits A, B.

By contrast, in the second switching position Z2 a service brake braking pressure p1, p2, p3, p4 corresponding to the respective reservoir pressure pVA, pVB is produced. Because there is normally a higher reservoir pressure pVA, pVB—for example 12 bar—the second switching position Z2 therefore results in maximum actuation of the respective wheel brakes 1, 2, 3, 4. It is thus achieved in a simple manner that with the second switching position Z2 set the vehicle 200 can be transitioned to a standstill under electronic control with maximum braking effect. The application of the wheel brakes 1, 2, 3, 4 is then carried out continuously with a constant service brake braking pressure p1, p2, p3, p4.

During operation, adjustment of the service brake braking pressures p1, p2, p3, p4 to the prevailing service brake control pressure pA, pB, which is determined by the switching position Z1, Z2 of the monostable bypass valve 16, is always automatically provided. Maintaining the service brake braking pressure p1, p2, p3, p4 following a changeover of the monostable bypass valve 16 or following a reduction of the braking command is therefore not possible, at least by means of the monostable bypass valve 16. The monostable bypass valve 16 only provides that guaranteed electronically redundant deceleration can be carried out in a safe state in the case of an emergency in the event of a failure of the electronics.

Setting the corresponding switching position Z1, Z2 of the monostable bypass valve 16 is controlled by a bypass control device 130 (bypass ECU), which can intervene in the braking electrically redundantly, for example in the event of a failure of the assistance control device 120 and/or of the service brake control device 110 and/or the corresponding axle modulator 9, 10, by outputting a bypass signal SU, by means of which the monostable bypass valve 16 is energized. In this case, a failure of the service brake control device 110 and/or of the assistance control device 120 and/or of the electronic actuation of the axle modulators 9, 10 can be detected by means of a diagnostic signal SD, for example.

In order to ensure a supply of power to the bypass control device 130 in a redundancy situation, a first energy source 50A is provided that supplies both the service brake control device 110, the assistance control device 120 and possibly also the bypass control device 130 with energy and a second energy source 50B that also or exclusively supplies the bypass control device 130 and that is independent of the first energy source 50A. The first energy source 50A and the second energy source 50B are both connected to a generator 50C, for example an alternator of the utility vehicle 200. In the event of a failure of the first energy source 50A, during which the electropneumatic brake system 100a can no longer be electrically controlled by means of the service brake control device 110 and the axle modulators 9, 10, electrically redundant actuation by means of the bypass control device 130 is thereby ensured.

Alternatively, only the first energy source 50A connected to the generator 50C may also be used, which is connected via a fuse to the service brake control device 110 and the assistance control device 120 and via a further fuse to the bypass control device 130.

Figure 1C:
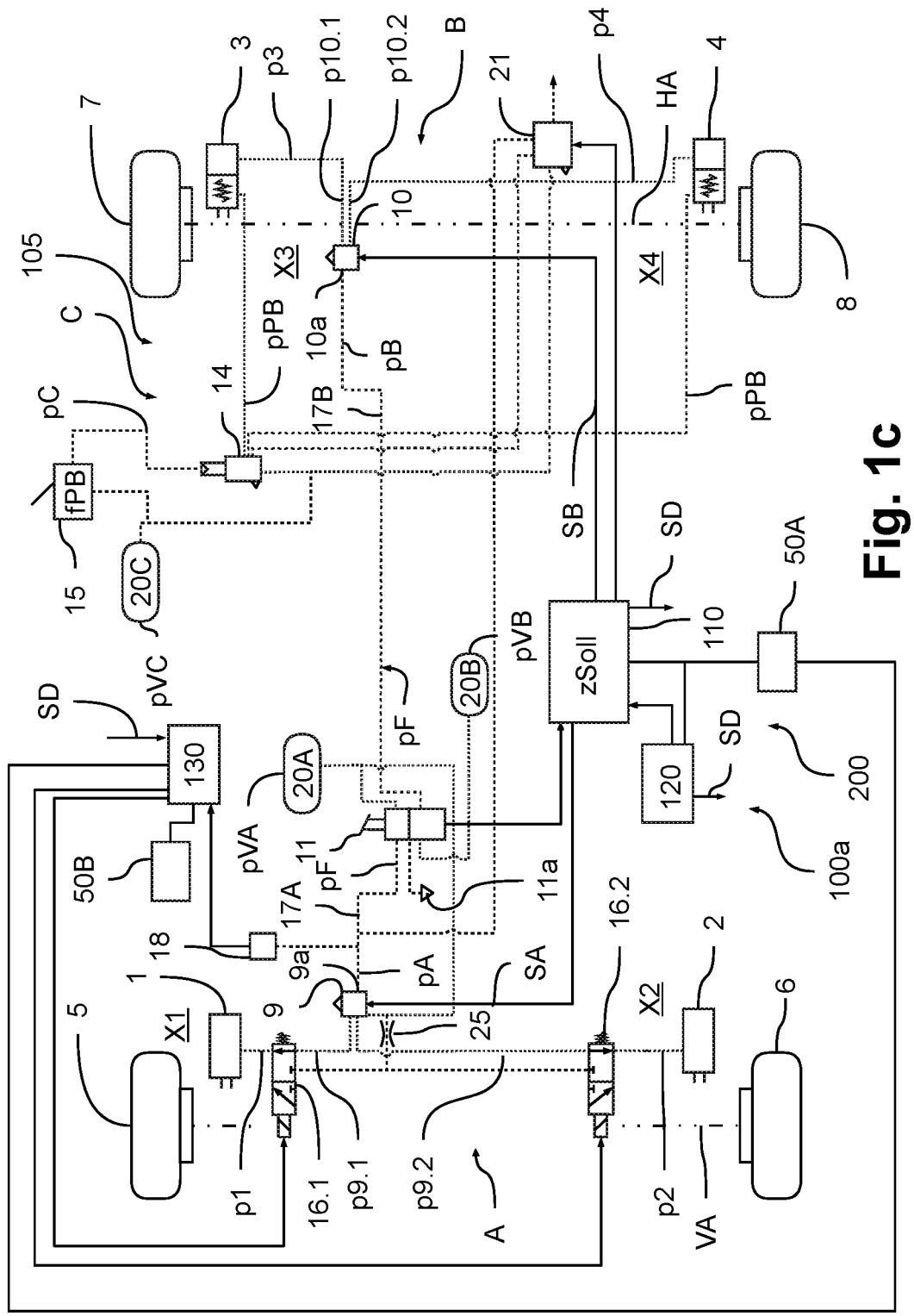
Figure 1E:
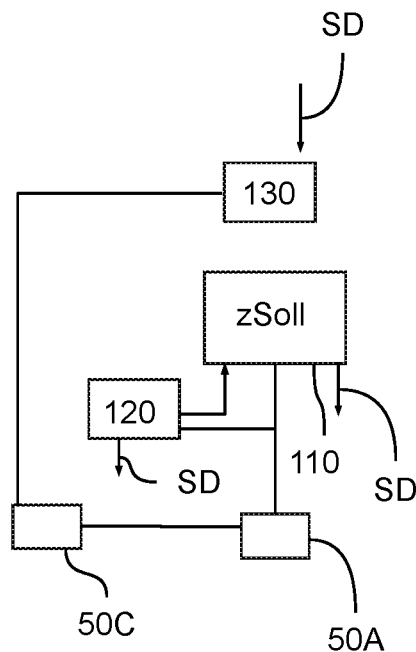

According to FIGS. 1e, f, g, alternative concepts for a redundant power supply are shown. According to an embodiment represented in FIG. 1e, it is provided to directly connect the bypass control device 130 to the generator 50C in a suitable manner and thereby to ensure a power supply and to connect the service brake control device 110 and the assistance control device 120 to the first energy source 50A. The generator 50C and the first energy source 50A are in this case separated from each other such that a short circuit in the generator 50C does not necessarily cause a short circuit in the first energy source 50A and vice-versa, so that both can supply energy mutually independently in a redundancy situation.

Figure 1F:
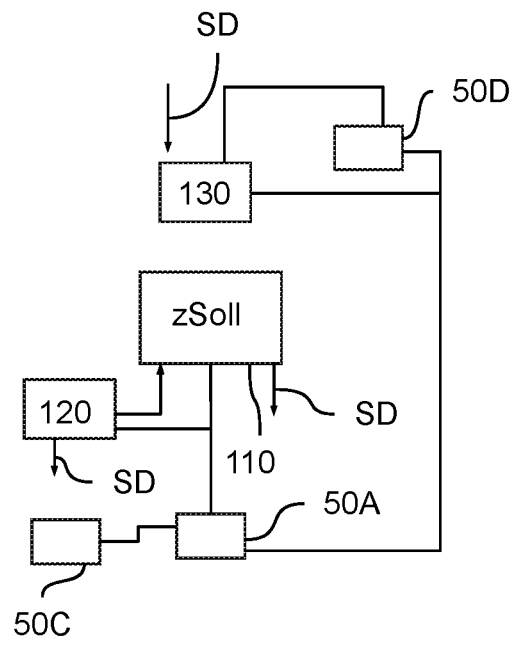

According to an embodiment represented in FIG. 1f, it is provided to use a short-term storage device 50D, for example a capacitor, in particular a power-cap, as an energy source, which is charged by the first energy source 50A during normal operation. If the first energy source 50A fails, the charged short-term storage device 50D is used as the power supply for the bypass control device 130.

Figure 1G:
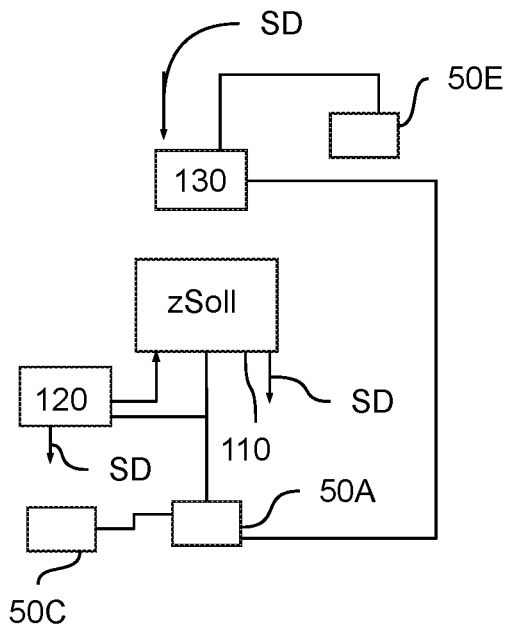

According to a further embodiment according to FIG. 1g, it is provided to use a high-voltage storage device 50E as a redundant power supply, which is used as an energy source for a drive in hybrid vehicles. This is also independent of the first energy source 50A and can thus be used as a redundant power supply for the bypass control device 130.

Alternatively, an additional redundant on-board system can also be established.

In the first switching position Z1, the monostable bypass valve 16 is de-energized, i.e. the monostable bypass valve 16 is not actuated by the bypass control device 130 with the bypass signal SU. Said first switching position Z1 is thus a stable switching position, into which the monostable bypass valve 16 automatically reverts without a specified bypass signal SU, which can be achieved by a spring preload, for example. The driver thus also still has the possibility to intervene in the braking in the event of a failure of the bypass control device 130. In addition, unintentional braking in the event of a power failure or faulty actuation is prevented. The second switching position Z2 is brought about by outputting a corresponding bypass signal SU that provides for energization of the monostable bypass valve 16.

In order to also be able to achieve an electronically specified graduated braking effect in a redundancy situation, the monostable bypass valve 16 is actuated by the bypass control device 130 in a pulsed manner, for example with a pulse width modulated bypass signal SU. I.e. the monostable bypass valve 16 is alternately changed over between the first switching position Z1 and the second switching position Z2. As a result, each controlled service brake control pressure pA, pB is not constant but oscillates back and forth between the actuation pressure pF (first switching position Z1) and the respective reservoir pressure pVA, pVB (second switching position Z2). If no manual actuation of the foot brake pedal 11 takes place in a redundancy situation, the service brake control pressure pA, pB thus oscillates back and forth between the atmospheric pressure pAtm coming from the ventilation connection 11a and the respective reservoir pressure pVA, pVB. However, in this case the lines and valves through which flow passes provide for a type of low pass filtering, which provides that the service brake control pressure pA, pB increases or decreases less strongly if there is switching back and forth between the two switching position Z1, Z2, so that the actuation pressure pF or the reservoir pressure pVA, pVB are not completely reached in the respective switching positions Z1, Z2.

By way of example, such a time profile of the first service brake control pressure pA according to the layout in FIG. 1b is represented in FIG. 1d, wherein a first service brake control pressure profile pApwm (dashed profile) results from the pulse width modulation (PWM) of the bypass signal SU, which is in particular a function of a pulse time t1 specifying the duration of a pulsed actuation by means of the bypass signal SU, and a pause time t2 specifying the duration in between in the de-energized state of the monostable bypass valve 16. The pulse time t1 can lie between 5 ms and 1000 ms and the pause time t2 between 0 ms and 2000 ms. The first service brake control pressure profile pApwm oscillates back and forth between the actuation pressure pF and the first reservoir pressure pVA, so that a different first service brake control pressure pA is output to the first axle modulator 9 depending on the point in time t.

In order to further smooth the oscillating first service brake control pressure profile pApwm and thereby achieve finer tuning, a choke 25 is provided between the monostable bypass valve 16 and the respective pressure medium reservoir 20A, 20B that constitutes a constriction for the pressure medium from the respective pressure medium reservoir 20A, 20B. The volumetric flow Q from the respective pressure medium reservoir 20A, 20B to the second input port 16b can be reduced by the choke 25. Thus, the corresponding reservoir pressure pVA, pVB builds up more slowly at the second input port 16b in the event of a changeover to the second switching position Z2, so that the profile of the respective service brake control pressure pA, pB is smoothed and a smoothed first service brake control pressure profile pAgl (solid profile) represented in FIG. 1d by way of example results, wherein this no longer oscillates back and forth so strongly, is displaced in time and thus provides less jerking during braking because the edges rise and fall less steeply during the increase and decrease.

Alternatively or in addition to the choke 25, a pressure reducer 40 can be provided, which as an active component provides that the respective reservoir pressure pVA, pVB passes to the second input port 16b with adjusted pressure. In this case, the respective reservoir pressure pVA, pVB can be passed by the pressure reducer 40 only up to a pressure limit pG of for example 8 bar or less in order to avoid an increase in the corresponding service brake control pressures pA, pB to such high pressures and thereby also to smooth the pressure profile or to reduce the gradients of the edges. Also, as a result heavy jerking during braking can be avoided.

The oscillating and smoothed pressure profile pAgl as a result of the pulse width modulated actuation by means of the bypass signal SU acts positively on the ride stability, because this acts like a type of cadence braking if times are used for the pulse time t1 and for the pause time t2 with which it is ensured that re-starting of a wheel that is tending to lock up can be carried out. This is for example the case if the service brake control pressure pA, pB or the service brake braking pressure p1, p2, p3, p4 is repeatedly falling below a pressure limit of for example 1 bar at least for a time limit of for example 0.25 s. Thus ensures that a wheel that is tending to lock can turn again.

Thus, owing to the pulse width modulation and the alternating changeover, an effectively constant average service brake control pressure pA, pB, with which the service brakes 1, 2, 3, 4 are actuated is not set. Rather, on average owing to the alternation of the service brake control pressure pA, pB a defined target vehicle deceleration zSoll is achieved, at which ride stability can be maintained. The pulse time t1 and the pause time t2 can in this case be configured such that acceptable values for the deceleration, the ride stability and the steerability can be guaranteed in the event of a redundant intervention. This is in particular advantageous if brake slip control by means of the service brake control device 110 and the electrical actuation of the axle modulator 9, 10 by means of the control signal SA, SB does not work because there is an electrical fault.

By means of an additional pressure sensor or a simple pressure switch 18, which according to FIG. 1a taps the second service brake control pressure pB and according to FIG. 1b taps the first service brake control pressure pA, it can additionally be achieved that in the event of a failure of the service brake control device 110 or the electrical function of the foot brake valve 11 the bypass control device 130 can detect whether braking was demanded pneumatically by actuation of the foot brake valve 11 when the monostable bypass valve 16 is in the first switching position Z1. As a result, redundant actuation by means of the monostable bypass valve 16 may be able to be aborted if it has been detected that the driver has intervened in the braking action and has thereby reacted to a failure. Furthermore, latent faults in the electropneumatic brake system 100a can be detected by means of a plausibility check.

According to the embodiment in FIG. 1c, the monostable bypass valve 16 is not disposed in the respective pneumatic path X1, X2, X3, X4 between the foot brake valve 11 and one of the axle modulators 9, 10, but between the first axle modulator 9 and the wheel brakes 1, 2 of the front axle VA. Because the pneumatic paths X1, X2 on the front axle VA branch off after the first axle modulator 9 to the respective wheel brakes 1, 2, according to said embodiment two monostable bypass valves 16.1, 16.2 are provided, each of which is actuated by the bypass control device 130 in order to set the corresponding switching position Z1, Z2.

Thus, in the event of actuation of the foot brake valve 11, an air volume-boosted axle modulator pressure 9.1, 9.2 is always controlled by the first axle modulator 9 in the corresponding path X1, X2 of the front axle VA depending on the first service brake control pressure pA, and if the first switching position Z1 of the two monostable bypass valves 16.1, 16.2 is set this is passed on as the service brake braking pressures p1, p2 to the wheel brakes 1, 2 on the front axle VA that are assigned to the respective monostable bypass valve 16.1, 16.2. Thus, in the first switching position Z1 of the two monostable bypass valves 16.1, 16.2, here too actuation of the wheel brakes 1, 2 on the front axle VA is carried out depending on the driver's command.

In the second switching position Z2, similarly to the embodiments in FIG. 1a and FIG. 1b, the first reservoir pressure pVA in this case of the first pressure medium reservoir pVA of the first brake circuit A of the front axle VA is passed through as the service brake braking pressure p1, p2 by the respective monostable bypass valve 16.1, 16.2, so that a maximum pressure build-up and hence maximum braking at the wheel brakes 1, 2 of the front axle VA is carried out.

Thus, according to said embodiment the respective monostable bypass valve 16.1, 16.2 always directly forwards a service brake braking pressure p1, p2 to the wheel brakes 1, 2 of the front axle VA.

As also in the previous embodiments in FIGS. 1a and 1b, the respective monostable bypass valve 16.1, 16.2 can be actuated by pulse width modulation, wherein synchronous actuation is preferably carried out in order to actuate both wheel brakes 1, 2 of the front axle VA at the same time with a cadence braking function and not to maintain any unintentional instabilities. However, by targeted asynchronous or different actuation of the two monostable bypass valves 16.1, 16.2, steering braking can be guaranteed with which the two wheel brakes 1, 2 on the front axle VA are braked with different strengths. FIG. 1c can also be provided analogously for the pneumatic paths X3, X4 of the rear axle HA.

Figure 2:
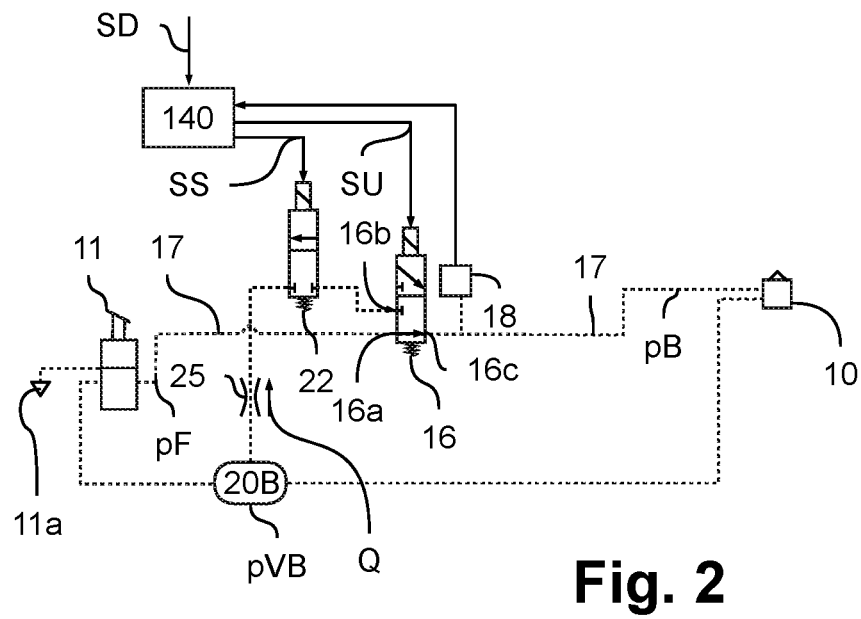
FIG. 2 shows a brake system with a safety function according to a further embodiment of the invention.

According to FIG. 2, a further implementation of the electropneumatic brake system 100a is revealed. Therefore, an additional safety valve 22, a 2/2-way valve, is provided in the second brake circuit B, which can be changed over or energized by the bypass control device 130 at the same time and in the same way as the monostable bypass valve 16 by means of a safety signal SS. As a result, an unintentional deceleration by means of the rear wheel brakes 3, 4 can be prevented in the event of a faulty and thus inadvertent changeover of the monostable bypass valve 16. Thus, a safety function can be implemented, because only if both valves 16, 22 are actually energized at the same time by means of the bypass signal SU or the safety signal SS does imposition of the second reservoir pressure pVB as the second service brake control pressure pB occur in order to brake by means of the rear wheel brakes 3, 4. Accordingly, in the embodiment according to FIG. 1b this can be implemented for the monostable bypass valve 16 in the first brake circuit A or in the embodiment according to FIG. 1c for the monostable bypass valves 16.1, 16.2.

The safety valve 22 can also be actuated in a pulsed manner, wherein in that case a likewise pulse width modulated safety signal SS is generated, which is modulated in synchronism with the bypass signal SU.

Figure 3:
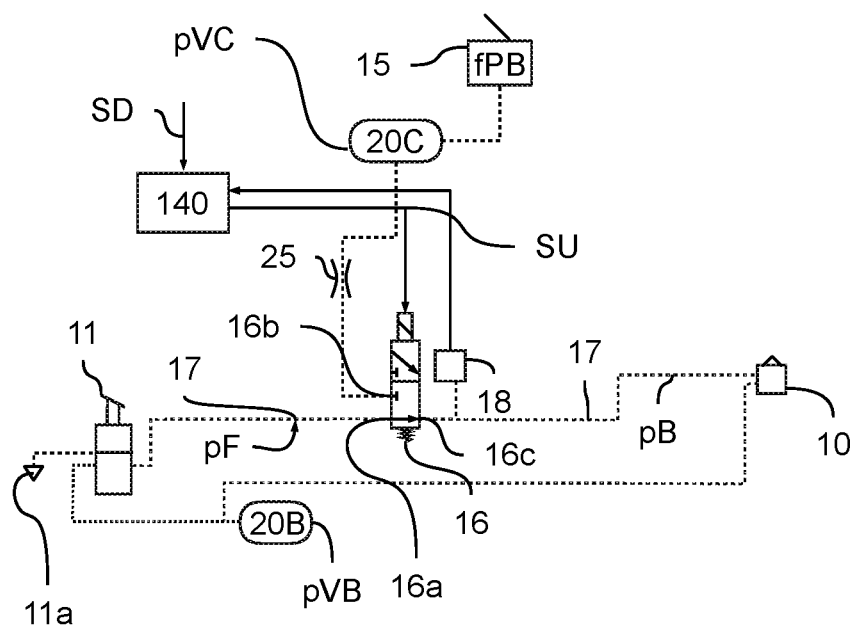
FIG. 3 shows a brake system with a bypass valve connection to a third pressure medium reservoir according to a further embodiment of the invention.

According to FIG. 3, in a further embodiment the second input port 16b of the monostable bypass valve 16 is connected to the third pressure medium reservoir 20C for the third brake circuit C, in which the parking brake 105 is operated. In said third pressure medium reservoir 20C, a third reservoir pressure pVC of for example only 8 bar prevails, which is significantly lower compared to the second reservoir pressure pVB of 12 bar in the first and second pressure medium reservoirs 20A, 20B. As a result, smoothing of the pulsed service brake control pressure pA, pB can be achieved because the service brake control pressure pA, pB cannot increase so much from the start. In addition, the service brake braking pressure p1, p2, p3, p4 at the respective wheel brake 1, 2, 3, 4 that is set in the event of unintentional energization of the bypass valve 16 is limited.

Figure 4:
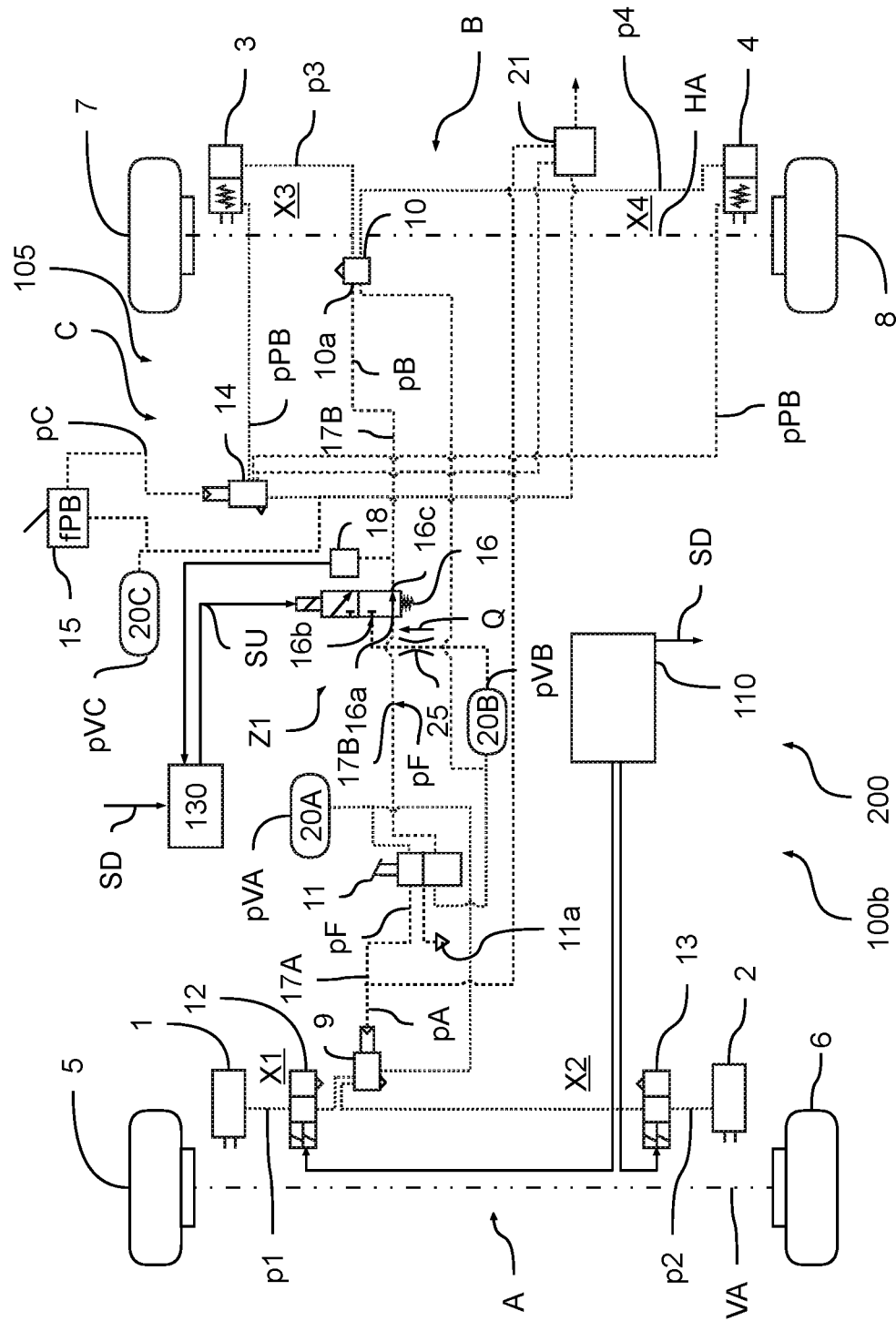
FIG. 4 shows a brake system with purely pneumatic actuation of the service brakes according to a further embodiment of the invention.

According to FIG. 4, a purely pneumatic brake system 100b without electronic actuation of the axle modulators 9, 10 is represented. I.e. in the first and second brake circuits A, B, braking is exclusively due to a pneumatic command in the pneumatic redundancy circuit, i.e. by means of the respective pneumatic path X1, X2, X3, X4. Only ABS control valves 12, 13 on the front axle VA are electronically actuated, by means of which a response can be made to a brake slip event on one of the wheels 5, 6 of the front axle VA under the control of the service brake control device 110. By means of the additional monostable bypass valve 16 in the—in this case—second brake circuit B, the pneumatic redundancy circuit or the pneumatic paths X3, X4 of the rear axle HA can also be electrically actuated. The implementations according to the previous figures can also be analogously used for said purely pneumatic brake system 100b.

Figure 5:
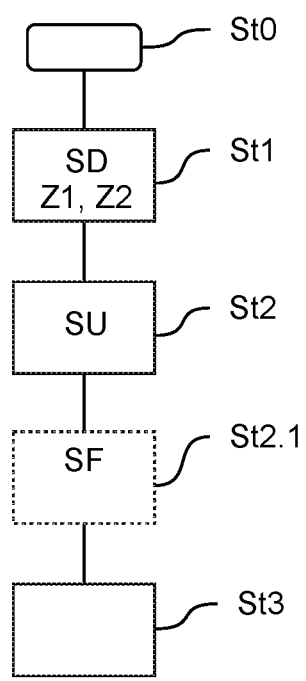
FIG. 5 shows a flow chart for carrying out a method according to an embodiment of the invention.

The actuation of the brake systems 100a, 100b can be carried out according to FIG. 5 as follows, for example:

In an initial step St0 the method starts, for example with starting the vehicle 200.

In a first step St1, using the diagnostic signal SD the bypass control device 130 determines whether there is a failure or a defect of the electrical actuation of the axle modulators 9, 10.

If this is the case, in a second step St2 a bypass signal SU is output by the bypass control device 130 to the respective monostable bypass valve 16; 16.1, 16.2 in order to decelerate the vehicle 200 in a safe state. The electrically controlled deceleration can for example be carried out if it has been determined that the driver is not intervening manually in the braking. This can be determined using the pressure switch 18, for example.

In order to implement a cadence braking function SF in a redundancy situation and thereby to improve ride stability and steerability, the bypass signal SU can also be generated using pulse width modulation in a sub step St2.1, i.e. switching back and forth between the first and the second switching positions Z1, Z2 takes place.

Because of the energization of the respective monostable bypass valve 16; 16.1, 16.2, a service brake control pressure pA, pB or a service brake braking pressure p1, p2, p3, p4 is forwarded—depending on the position in the pneumatic path X1, X2, X3, X4—by the respective monostable bypass valve 16; 16.1, 16.2 in a third step St3, wherein in the case of continuous energization of the monostable bypass valve 16; 16.1, 16.2 the forwarded pressure corresponds to the possibly pressure-adjusted reservoir pressure pVA, pVB, pVC, so that a service brake braking pressure p1, p2, p3, p4 is provided that brings about heavy braking.

In the event of pulse width modulated actuation of the monostable bypass valve 16; 16.1, 16.2, in step St2.1 the output of a service brake control pressure pA, pB or a service brake braking pressures p1, p2, p3, p4 is carried out by the respective monostable bypass valve 16; 16.1, 16.2, wherein the output pressure oscillates back and forth between the actuation pressure pF or the air volume-boosted axle modulator pressure p9.1, p9.2, p10.1, p10.2 and the possibly pressure-adjusted reservoir pressure pVA, pVB, pVC of the respective pressure medium reservoir 20A, 20B, 20C, so that a cadence braking function is implemented.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1, 2, 3, 4 wheel brake
5, 6, 7, 8 wheels
9 first axle modulator
9a first pneumatic control input
10 second axle modulator
10a second pneumatic control input
11 foot brake valve
11a venting connection
12, 13 ABS control valves
14 parking brake-relay valve
15 parking brake valve
16 monostable bypass valve
16a first input port
16b second input port
16c output port
17A, 17B control line for the respective brake circuit A, B
18 pressure sensor/pressure switch
20A first pressure medium reservoir for brake circuit A,
20B second pressure medium reservoir for brake circuit B,
20C third pressure medium reservoir for brake circuit C,
21 trailer control valve
22 safety valve
25 choke
40 pressure reducer
50A first energy source
50B second energy source
50C generator
50D short-term storage device
50E high-voltage storage device
100a electropneumatic brake system
100b purely pneumatic brake system
110 service brake control device (ECU)
120 assistance control device (ADAS-ECU)
130 bypass control device (bypass ECU)
200 vehicle
A, B, C brake circuits
fPB parking brake force
p1, p2, p3, p4 service brake braking pressure
pA, pB service brake control pressure of the respective brake circuits A, B
pApwm first service brake control pressure profile
pAgl smoothed first service brake control pressure profile
pAtm atmospheric pressure
pC parking brake control pressure
pF actuation pressure
pPB parking brake braking pressure
pVA, pVB, pVC reservoir pressure in the respective pressure medium reservoir 20A, 20B, 20C
Q volumetric flow SA, SB control signal
SF cadence braking function
SU bypass signal
SS safety signal
t point in time
t1 pulse time
t2 pause time
VA, HA axles of the vehicle
X1, X2 pneumatic paths of the front axle VA
X3, X4 pneumatic paths of the rear axle HA
Z1 first switching position
Z2 second switching position
zSoll target vehicle deceleration
St1, St2, St2.1, St3 steps of the method

The invention claimed is:

1. An electronically controllable pneumatic brake system for a vehicle, the electronically controllable pneumatic brake system comprising:
   wheel brakes configured to brake wheels of the vehicle, wherein a service brake braking pressure is imposable on each of the wheel brakes via pneumatic paths starting from a foot brake valve; and
   an electronically controllable monostable bypass valve having a first switching position and a second switching position actuable by a bypass signal provided by a bypass control device for redundant electro-pneumatic actuation of the wheel brakes responsive to a failure of the electronically controlled actuation of the wheel brakes, wherein the monostable bypass valve is disposed in a respective pneumatic path of the pneumatic paths;
   wherein in the first switching position of the monostable bypass valve, the service brake braking pressure in the respective pneumatic path is derivable depending on an actuation pressure produced by manual actuation of the foot brake valve,
   wherein in the second switching position of the monostable bypass valve, the service brake braking pressure in the respective pneumatic path is specifiable depending on a reservoir pressure prevailing in a pressure medium reservoir,
   wherein the service brake braking pressure in the respective pneumatic path is producible by a changeover of the monostable bypass valve depending only on the actuation pressure and/or depending on the reservoir pressure to implement an electro-pneumatic redundancy, and
   wherein the monostable bypass valve is in the first switching position responsive to no actuation by the bypass signal and changes into the second switching position responsive to actuation by the bypass signal,
   wherein the first switching position is a stable switching position, and
   wherein the first switching position is a de-energized position and the second switching position is an energized switching position.

2. The electronically controllable pneumatic brake system as claimed in claim 1, wherein an axle modulator is disposed in the respective pneumatic path between the foot brake valve and a respective wheel brake, wherein the axle modulator outputs an air volume-boosted axle modulator pressure depending on a service brake control pressure.

3. The electronically controllable pneumatic brake system as claimed in claim 2, wherein the monostable bypass valve is disposed in the pneumatic path in a control line between the foot brake valve and a pneumatic control input of the axle modulator, and
   wherein the monostable bypass valve connects, in the first switching position, the foot brake valve to the pneumatic control input of the axle modulator to select the actuation pressure as the service brake control pressure, and connects, in the second switching position, the pressure medium reservoir to the pneumatic control input of the axle modulator to select the service brake control pressure depending on the reservoir pressure.

4. The electronically controllable pneumatic brake system as claimed in claim 2, wherein the monostable bypass valve is disposed between the axle modulator and a wheel brake in the respective pneumatic path, and
   wherein the monostable bypass valve connects, in the first switching position, the axle modulator to the respective wheel brake to forward the air volume-boosted axle modulator pressure as the service brake braking pressure depending on the actuation pressure demanded by the manual actuation of the foot brake valve, and connects, in the second switching position, the pressure medium reservoir to the respective wheel brake to select the service brake braking pressure depending on the reservoir pressure.

5. The electronically controllable pneumatic brake system as claimed in claim 4, wherein each of the plurality of pneumatic paths includes a monostable bypass valve, and wherein each of the monostable bypass valves is configured to be switched mutually independently to carry out steering braking.

6. The electronically controllable pneumatic brake system as claimed in claim 1, wherein the bypass control device is configured to provide the bypass signal in a pulse width modulated manner for alternating changeover between the first switching position and the second switching position to implement graduated braking and to implement a cadence braking function by varying the service brake braking pressure.

7. The electronically controllable pneumatic brake system as claimed in claim 6, wherein the monostable bypass valve is alternately energized for a pulse time and de-energized for a pause time for alternating changeover of the monostable bypass valve, wherein the pulse time lies between 5 ms and 1000 ms and the pause time lies between 0 ms and 2000 ms.

8. The electronically controllable pneumatic brake system as claimed in claim 1, wherein a choke and/or a pressure reducer is disposed between the respective pressure medium reservoir and the monostable bypass valve to limit a volumetric flow passing to the monostable bypass valve or the reservoir pressure passing to the monostable bypass valve.

9. The electronically controllable pneumatic brake system as claimed in claim 1, wherein the monostable bypass valve is implemented as an electronically controllable 3/2-way valve.

10. The electronically controllable pneumatic brake system as claimed in claim 1, wherein a safety valve that is energized at the same time as the monostable bypass valve is disposed between the monostable bypass valve and the pressure medium reservoir to implement a safety function, by which the imposition of the service brake braking pressures as a function of the reservoir pressure is preventable in the event of unintentional setting of the second switching position of the monostable bypass valve.

11. A vehicle with an electronically controlled pneumatic brake system as claimed in claim 1.

12. The vehicle as claimed in claim 11, wherein the vehicle comprises a utility vehicle.

13. A method for electronic control of a pneumatic brake system, the method comprising:

determining whether there is a failure of an electronic actuation of wheel brakes configured to brake wheels of a vehicle;

actuating a monostable bypass valve by a bypass signal provided by a bypass control device responsive to the failure of the electronic actuation of the wheel brakes to provide redundant electro-pneumatic actuation of the wheel brakes, wherein the monostable bypass valve has a first switching position and a second switching position and is disposed in a pneumatic path starting from a foot brake valve; and producing a service brake braking pressure depending on an actuation pressure provided by the non-actuated foot brake valve and/or depending on the reservoir pressure, and wherein the monostable bypass valve is in the first switching position responsive to no actuation by the bypass signal and changes into the second switching position responsive to actuation by the bypass signal, wherein the first switching position is a stable switching position, and wherein the first switching position is a de-energized position and the second switching position is an energized switching position.

14. The method as claimed in claim 13, wherein the bypass control device provides the bypass signal in a pulse width modulated manner, wherein as a result the monostable bypass valve is alternately switched back and forth between the first switching position and the second switching position, the monostable bypass valve being energized for a pulse time and is de-energized for a pause time so that the service brake braking pressure varies to implement the cadence braking function.

* * * * *